United States Patent
Anderson

[11] Patent Number: 5,957,241
[45] Date of Patent: Sep. 28, 1999

[54] OIL DRIP MAT APPARATUS

[76] Inventor: Charlie Roy Anderson, 8591 Fairfield Ave., Las Vegas, Nev. 89123

[21] Appl. No.: 08/947,513

[22] Filed: Oct. 10, 1997

[51] Int. Cl.$^6$ .................................................. F16N 31/02
[52] U.S. Cl. ................................. 184/106; 428/81; 442/2
[58] Field of Search ............................. 184/106; 428/81, 428/83; 442/2

[56] References Cited

U.S. PATENT DOCUMENTS

| | | | |
|---|---|---|---|
| 468,353 | 2/1892 | Maussner | 184/106 |
| 1,094,210 | 4/1914 | Hughes | 184/106 |
| 2,187,676 | 1/1940 | Bienwen | 184/106 |
| 2,986,235 | 5/1961 | Weibert, Jr. | 184/106 |
| 3,062,323 | 11/1962 | Oganovic | 184/106 |
| 3,282,381 | 11/1966 | Fitzpatrick | 184/106 |
| 3,329,231 | 7/1967 | Takenouchi | 184/106 |
| 3,722,626 | 3/1973 | Stack | 184/106 |
| 4,479,280 | 10/1984 | Yamazaki et al. | 428/81 |
| 5,128,189 | 7/1992 | Bartlett | 184/106 |
| 5,688,843 | 11/1997 | Inaoka et al. | 523/216 |

Primary Examiner—Tamara L. Graysay
Assistant Examiner—Chong H. Kim

[57] ABSTRACT

A new oil drip mat apparatus for collecting oil which drips from motor vehicles and the like. The inventive device includes a base member having a planar bottom mat portion and a beveled rim fastened to the top surface of the mat portion to define a holding area. A plurality of layers of material are disposed within the holding area, with each layer performing a specific function. Two of the layers are a detergent mixture layer for absorbing and breaking down the oil, one of the layers is an animal hair layer for further absorbing oil, and one layer is a porous, stiff fibrous layer which allows passage of oil therethrough. The outermost layer is a u.v. resistant material which protects the underlying layers from the effects of the sun when the apparatus is used outdoors. If used indoors, the outermost layer is made of a porous, non-slip fabric material.

10 Claims, 2 Drawing Sheets

OIL DRIP MAT APPARATUS

BACKGROUND OF THE INVENTION

1. Field of the Invention

The present invention relates to oil drip collectors and more particularly pertains to a new oil drip mat apparatus for collecting oil which drips from motor vehicles and the like.

2. Description of the Prior Art

The use of oil drip collectors is known in the prior art. More specifically, oil drip collectors heretofore devised and utilized are known to consist basically of familiar, expected and obvious structural configurations, notwithstanding the myriad of designs encompassed by the crowded prior art which have been developed for the fulfillment of countless objectives and requirements.

Known prior art oil drip collectors include U.S. Pat. Nos. 3,722,626; 3,454,124; 4,936,418; 4,875,537; 3,815,702; and 3,651,884.

While these devices fulfill their respective, particular objectives and requirements, the aforementioned patents do not disclose a new oil drip mat apparatus. The inventive device includes a base member having a planar bottom mat portion and a beveled rim fastened to the top surface of the mat portion to define a holding area. A plurality of layers of material are disposed within the holding area, with each layer performing a specific function. Two of the layers are a detergent mixture layer for absorbing and breaking down the oil, one of the layers is an animal hair layer for further absorbing oil, and one layer is a porous, stiff fibrous layer which allows passage of oil therethrough. The outermost layer is a u.v. resistant material which protects the underlying layers from the effects of the sun when the apparatus is used outdoors. If used indoors, the outermost layer is made of a porous, non-slip fabric material.

In these respects, the oil drip mat apparatus according to the present invention substantially departs from the conventional concepts and designs of the prior art, and in so doing provides an apparatus primarily developed for the purpose of collecting oil which drips from motor vehicles and the like.

SUMMARY OF THE INVENTION

In view of the foregoing disadvantages inherent in the known types of oil drip collectors now present in the prior art, the present invention provides a new oil drip mat apparatus construction wherein the same can be utilized for collecting oil which drips from motor vehicles and the like.

The general purpose of the present invention, which will be described subsequently in greater detail, is to provide a new oil drip mat apparatus which has many of the advantages of the oil drip collectors mentioned heretofore and many novel features that result in a new oil drip mat apparatus which is not anticipated, rendered obvious, suggested, or even implied by any of the prior art oil drip collectors, either alone or in any combination thereof.

To attain this, the present invention generally comprises a base member having a planar bottom mat portion and a beveled rim fastened to the top surface of the mat portion to define a holding area. A plurality of layers of material are disposed within the holding area, with each layer performing a specific function. Two of the layers are a detergent mixture layer for absorbing and breaking down the oil, one of the layers is an animal hair layer for further absorbing oil, and one layer is a porous, stiff fibrous layer which allows passage of oil therethrough. The outermost layer is a u.v. resistant material which protects the underlying layers from the effects of the sun when the apparatus is used outdoors. If used indoors, the outermost layer is made of a porous, non-slip fabric material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oil drip mat apparatus which has many of the advantages of the oil drip collectors mentioned heretofore and many novel features that result in a new oil drip mat apparatus which is not anticipated, rendered obvious, suggested, or even implied by any of the prior art oil drip collectors, either alone or in any combination thereof.

It is another object of the present invention to provide a new oil drip mat apparatus which may be easily and efficiently manufactured and marketed.

It is a further object of the present invention to provide a new oil drip mat apparatus which is of a durable and reliable construction.

An even further object of the present invention is to provide a new oil drip mat apparatus which is susceptible of a low cost of manufacture with regard to both materials and labor, and which accordingly is then susceptible of low prices of sale to the consuming public, thereby making such oil drip mat apparatus economically available to the buying public.

Still yet another object of the present invention is to provide a new oil drip mat apparatus which provides in the apparatuses and methods of the prior art some of the advantages thereof, while simultaneously overcoming some of the disadvantages normally associated therewith.

Still another object of the present invention is to provide a new oil drip mat apparatus for collecting oil which drips from motor vehicles and the like.

Yet another object of the present invention is to provide a new oil drip mat apparatus which includes a base member having a planar bottom mat portion and a beveled rim fastened to the top surface of the mat portion to define a holding area. A plurality of layers of material are disposed within the holding area, with each layer performing a specific function. Two of the layers are a detergent mixture layer for absorbing and breaking down the oil, one of the layers is an animal hair layer for further absorbing oil, and one layer is a porous, stiff fibrous layer which allows passage of oil therethrough. The outermost layer is a u.v. resistant material which protects the underlying layers from the effects of the sun when the apparatus is used outdoors. If used indoors, the outermost layer is made of a porous, non-slip fabric material.

Still yet another object of the present invention is to provide a new oil drip mat apparatus that preserves and protects the environment by collecting and containing oil therein.

Even still another object of the present invention is to provide a new oil drip mat apparatus that prevents staining of concrete and asphalt due to dripping oil.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
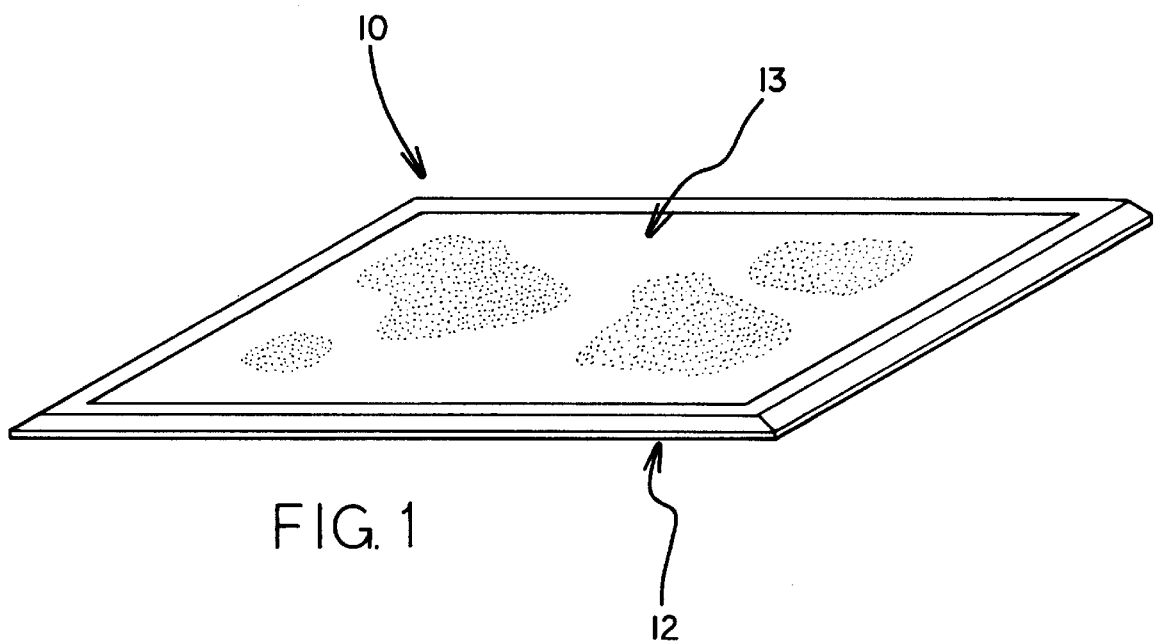
FIG. 1 is an elevated perspective view of a new oil drip mat apparatus according to the present invention.
Figure 2:
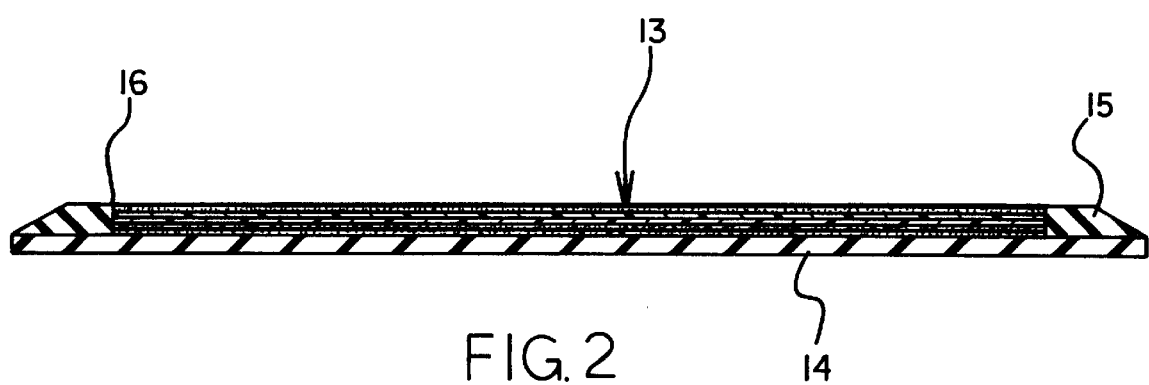
FIG. 2 is a cross sectional view taken through a portion of the oil drip mat apparatus.
Figure 3:
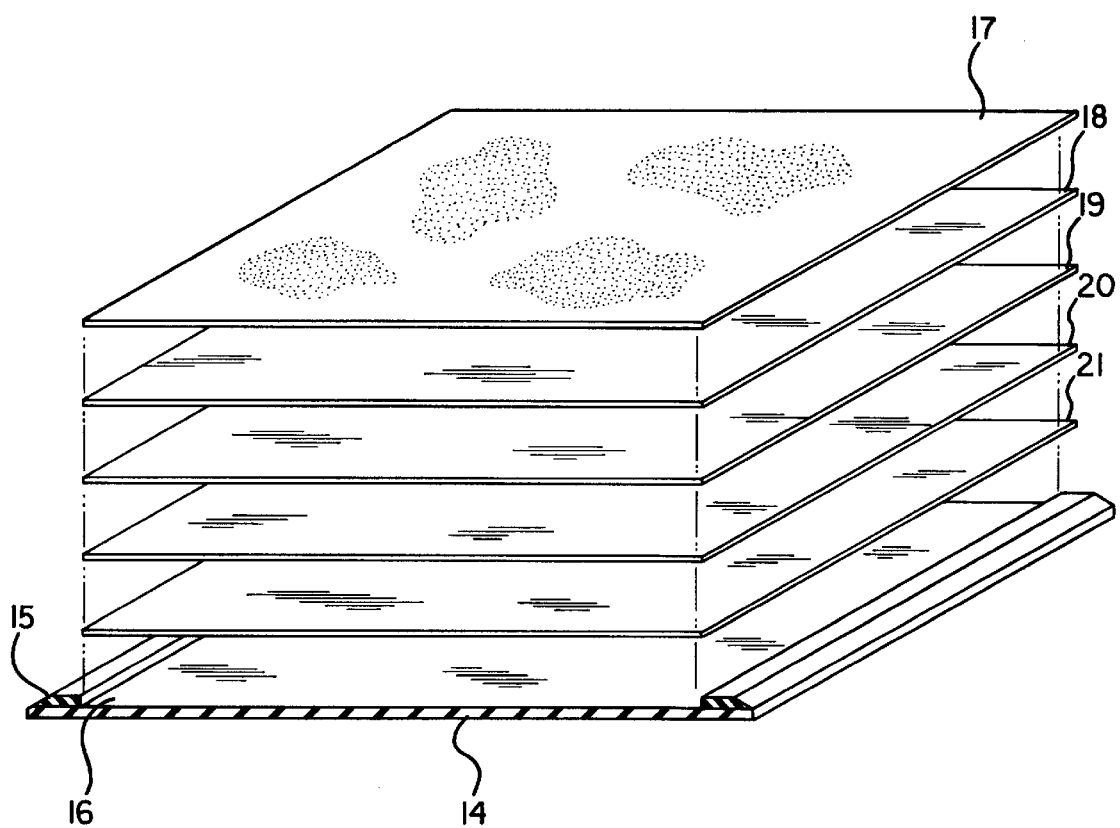
FIG. 3 is an exploded view of the components of the oil drip mat apparatus.

With reference now to the drawings, and in particular to FIGS. 1 through 3 thereof, a new oil drip mat apparatus embodying the principles and concepts of the present invention and generally designated by the reference numeral 10 will be described.

As best illustrated in FIGS. 1 through 3, the oil drip mat apparatus 10 comprises a base member 12 and a plurality of layers of material 13 supported by the base member. The base member 12, in use, is meant to be disposed upon the surface of a garage, driveway, etc., such as concrete, asphalt, soil, underneath a vehicle in order to collect oil and other fluids which leak from the vehicle. Staining and other damage to such surfaces is therefore prevented.

The base member 12, as illustrated in FIGS. 2 and 3, comprises a bottom mat portion 14 with a rectangular, beveled rim section 15 fastened to the top surface thereof, such as with an adhesive. The bottom mat portion 14 is preferably a planar, rectangular sheet of flexible resilient material, such as foam rubber, rubber, or plastic. The rim section 15 is composed of four beveled members forming a rectangle and fastened adjacent to the outer edges of the mat portion to form a rectangular holding area 16 in which the layers of material 13 are disposed. The rim section is formed of a high strength, non-slip material in order to withstand the force if driven or stepped on and to prevent slippage during such occurrences. A material such as 3M Safety Walk™ material produced by the 3M Company of St. Paul, Minn. is preferred.

The layers of material 13 include a first, outermost layer 17 made of a slip resistant, porous material to allow oil and other liquids to flow through to the layers below and to prevent slipping if stepped on. For outdoor use where the apparatus is subject to sunlight and the environment, the layer 17 is preferably made of a high strength, knitted fabric mesh material which is resistant to the sun's u.v. rays, such as SOLARTEX™ made by Gale Group Inc. of Winter Park, Fla. By making the layer 17 u.v. resistant, heating of the layers and material disposed beneath the layer 17 by the sun is reduced, thus maintaining the apparatus 10 relatively cool. The high strength material is also damage resistant if driven or stepped on. For indoor use, or where sunlight is not a problem, the layer 17 is preferably made of a high strength, mesh material such as SCOOT-GARD™ made by Vantage Industries of Atlanta, Ga.

Disposed directly below the layer 17 is a detergent mixture layer 18 which absorbs and breaks down at least some of the oil that goes through the layer 17. The detergent mixture comprises a mixture of a detergent for breaking down the oil, such as the detergent known as TETRO™ manufactured by U.N.X. Chemicals, Inc. of Greenville, N.C. and an argillaceous, particulate material that is highly absorbent with respect to oil, such as clay dirt/kitty litter, kaolin, or fullers earth. A further particulate material for absorbing further quantities of oil, such as sand, is also included in the detergent mixture. For indoor use of the drip mat 10, a detergent or soap other than TETRO™ should be used, such as a standard laundry detergent, which is able to break down oil.

A layer 19 of porous, stiff, fibrous material is disposed below the layer 18. The material forming the layer 19 is similar to a scrubbing pad, and is porous so as to allow oil to flow therethrough. However, like a scrubbing pad, the layer 19 can be compressed, but it does not suck up oil and other fluids located below the layer 19 when compressed or after release of the compressing force. Therefore, if the drip mat is stepped on, the layer 19 will compress, but it will prevent oil and other fluids from moving upward toward the top of the mat and getting on the feet of the person who stepped on the mat.

Disposed below the layer 19 is an oil absorbing layer 20 of loosely disposed animal hair. Oil and other remaining fluids which contact the layer 20 clings to the hair, to retain the oil and other fluids within the mat. Any type of animal hair could be used, such as dog hair and wool. Feathers could also be used in place of the animal hair.

The final layer 21 is disposed on top of the bottom mat portion 14 and is composed of a detergent mixture generally similar to the detergent mixture in the layer 18. However, the detergent mixture in layer 21 is mainly composed of the argillaceous, particulate material, and smaller quantities of the detergent and sand, since little oil remains to contact the layer 21. The small amount of oil which does contact the layer 21 is absorbed by the argillaceous material and sand, and broken down by the detergent.

A deodorizing agent, such as charcoal or a scent material, can be incorporated if desired into at least one of the layers 17–21 in order to neutralize the smell of the oil and other fluids. Preferably the deodorizing agent is mixed into one of, or both, the detergent mixture layers.

The layers 17–21 can be secured to each other using a suitable adhesive, or else the layers 17–21 can be loosely disposed relative to each other. In either case, the layers should be removable from the holding area 16 so that the layers can be replaced when needed.

In use, the drip mat 10 is disposed underneath the engine of a vehicle or other apparatus utilizing an engine. As oil leaks from the engine, it drips onto the mat, and goes through the top porous layer 17. It then contacts the detergent mixture layer 18, where a large portion of the oil is absorbed by the argillaceous material and sand, and then broken down by the detergent. Any remaining oil or liquids then flow through the porous layer 19 and into the animal hair/feather layer 20 where a large portion clings to the hair or feathers. The detergent mixture layer 21 receives any last remaining amounts of oil and other liquids, which are absorbed by the argillaceous material and sand, and broken down by the detergent. If the drip mat is used outdoors and exposed to the sun, the u.v. resistant layer 17 blocks a portion of the u.v. rays of the sun to keep the layers below it from being substantially heated by the sun. For either indoor or outdoor use however, the top layer 17 should be slip resistant, so that if a person steps on the mat, or if a vehicles wheel drives on the mat, slippage will be prevented. The mat can have any appropriate size or shape so as to fit under the engine and catch any drips emanating therefrom.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. An oil drip mat apparatus, comprising:
   a base member including a bottom mat portion with a beveled rim extending from a top surface thereof, said beveled rim being disposed adjacent outer edges of the bottom mat portion and defining therewith a holding area;
   a plurality of layers of material disposed within said holding area, at least one of said layers comprising a first layer of detergent mixture, at least one of said layers comprising a second layer of detergent mixture, at least one of said layers comprising a layer of animal hair, at least one of said layers comprising a layer of porous, stiff, fiborous material, and at least one of said layers comprising a slip resistant material; wherein said slip resistant layer is an outermost layer of said layers; and
   said first layer of detergent mixture is disposed under said slip resistant material layer, said layer of porous, stiff, fibrous material is disposed under said first layer of detergent mixture, said layer of animal hair is disposed under said layer of porous, stiff, fibrous material, and said second layer of detergent mixture is disposed under said layer of animal hair and adjacent said bottom mat portion.

2. The oil drip mat apparatus according to claim 1, wherein said bottom mat portion is made of a flexible, resilient material.

3. The oil drip mat apparatus according to claim 2, wherein said flexible, resilient material comprises a rubber material.

4. The oil drip mat apparatus according to claim 1, wherein said beveled rim is made of a slip resistant material.

5. The oil drip mat apparatus according to claim 1, wherein said beveled rim is fastened to said bottom mat portion.

6. The oil drip mat apparatus according to claim 1, wherein said first layer of detergent mixture and said second layer of detergent mixture comprise an argillaceous material, a particulate material, and a detergent.

7. The oil drip mat apparatus according to claim 6, wherein said particulate material comprises sand.

8. The oil drip mat apparatus according to claim 1, wherein said slip resistant material is u.v. resistant.

9. The oil drip mat apparatus according to claim 8, wherein said slip resistant material is a knitted fabric which is porous.

10. The oil drip mat apparatus according to claim 1, further comprising a deodorizing agent incorporated in one of said plurality of layers.

* * * * *